United States Patent
Feist

(10) Patent No.: US 6,185,055 B1
(45) Date of Patent: Feb. 6, 2001

(54) 360-DEGREE ALL-AROUND REFLECTOR

(75) Inventor: Wieland Feist, Jena (DE)

(73) Assignee: Carl Zeiss Jena GmbH, Jena (DE)

( * ) Notice: Under 35 U.S.C. 154(b), the term of this patent shall be extended for 0 days.

(21) Appl. No.: 09/326,268

(22) Filed: Jun. 7, 1999

(30) Foreign Application Priority Data

Aug. 7, 1998 (DE) .............................................. 198 35 700

(51) Int. Cl.⁷ .............................. G02B 5/04; G02B 5/122
(52) U.S. Cl. .......................... 359/831; 359/529; 359/834; 33/293
(58) Field of Search ..................................... 359/529–530, 359/542–546, 831–837; 33/293–296, 520, 613, 644; 425/808; 356/372, 375, 376, 358

(56) References Cited

U.S. PATENT DOCUMENTS

| | | | | |
|---|---|---|---|---|
| 1,658,265 | * | 2/1928 | Thompson | 359/530 |
| 2,099,671 | * | 11/1937 | Bairey | 359/529 |
| 3,834,789 | * | 9/1974 | Brudy | 359/831 |
| 4,416,509 | | 11/1983 | Mian | 359/529 |
| 4,875,760 | * | 10/1989 | Youngren et al. | 359/529 |
| 5,301,435 | * | 4/1994 | Buckley | 33/293 |

* cited by examiner

*Primary Examiner*—Thong Nguyen
(74) *Attorney, Agent, or Firm*—Reed Smith LLP

(57) ABSTRACT

An all-around reflector for retroreflection of beams which comprises, as reflectors, triple prisms with round light entrance surfaces, wherein the triple prisms are arranged in a housing in such a way that their light entrance surfaces are part of the circumferential surfaces of the housing. The triple prisms are arranged in the housing in such a way that adjacent triple prisms contact, or almost contact, at a point inside the housing. The tips (corners) of the triple prisms lie in a plane extending vertical to the light entrance surfaces of the triple prisms wherein the axes of the triple prisms which intersect at a point are also located in this plane. Triple prisms which are located next to one another are oriented relative to one another so as to be rotated about their axes by 60°.

8 Claims, 1 Drawing Sheet

360-DEGREE ALL-AROUND REFLECTOR

BACKGROUND OF THE INVENTION a) Field of the Invention

The invention is directed to a 360-degree all-around reflector with retroreflectors that are triple prisms, especially for application in geodetic surveying with tachymeters and other geodetic measurement devices.

b) Description of the Related Art

In recent years, 360-degree all-around reflectors have made up a fixed component in electronic tachymeters for tracking reflectors on land. Continuous target tracking is made possible through further automation of the electronic tachymeter and is used to an increasing extent in practice. 360-degree all-around reflectors have also become increasingly important for controlling construction machinery because automation in the positioning of this machinery is also desired.

U.S. Pat. No. 4,875,760 (Youngren) discloses a 360-degree all-around reflector unit with a base body, wherein a quantity of retroreflectors are arranged at the periphery of the base body in such a way that they cover an angular area of 360° in a plane. Accordingly, it is possible to reflect incident light from light sources or target beams of geodetic devices lying in the reflector plane back to the starting point.

U.S. Pat. No. 5,301,435 (Buckley) describes an all-around reflector arrangement comprising prisms which are arranged in two tiers of three prisms each at the periphery of a cylinder, so that they cover an angular area of 360° and incident light, for example, from a target station, is reflected back to the base station. Known triple prisms are used as retroreflectors.

In a 360-degree all-around reflector, it depends in particular on how close to one another the reflectors can be arranged and on the size of the angle of the adjacent reflectors relative to one another in order that the pupils, when symmetrically adjusted, are cut evenly and at most only by half. In this case, the apparent tips of the reflectors lie in a plane; that is, they are not offset with respect to height, so that pointing or sighting can always be carried out visually or also automatically at the same height. If the effective total surface of the pupil changes only slightly, this also results in only slight energy loss and there is therefore also no range loss when measuring distances with tachymeters. The arrangements of Youngren and Buckley do not meet these requirements. The spacing between the individual adjacent reflectors is relatively large.

In an arrangement for retroreflection of a beam with triple mirrors such as is described in DE 195 30 809 (Leica AG), a 360-degree all-around reflector is provided in which the prisms are tightly packed relative to one another, but whose apparent centers are offset with respect to height. The pupils are therefore offset with respect to height resulting in disadvantages for a range finder with a biaxially arranged transmitting and receiving light bundle with respect to positioning accuracy and precision of distance measurement. In order to avoid these disadvantages, the respective prism entrance surface must be aligned more exactly with the target line of the tachymeter at the target point. While this is possible for picking up the measurement point, it entails grave difficulties with respect to controlling construction machinery, for example.

OBJECT AND SUMMARY OF THE INVENTION

Therefore, the primary object of the invention is to provide a 360-degree all-around reflector in which disadvantages with respect to positioning accuracy and precision of distance measurement caused by an offsetting of pupils with respect to height are eliminated to a great extent with minimum signal loss.

This object of the invention is met according to the invention through a 360-degree all-around reflector for retroflection of beams. The reflector comprises a housing and triple prisms, as reflectors, with round light entrance surfaces, wherein the triple prisms are arranged in the housing in such a way that their light entrance surfaces are part of circumferential surfaces of the housing. The triple prisms are arranged in the housing in such a way that adjacent triple prisms contact at a point, or almost contact at a point, inside the housing. The triple prisms have tips or covers which lie in a plane extending perpendicular to the light entrance surfaces of the triple prisms. The triple prisms have axes and the axes of the triple prisms which intersect at a point are also located in this plane. The triple prisms which are located next to one another are oriented relative to one another so as to be rotated about their axes by an angle of 60°.

It is advantageous when six triple prisms are provided in the housing. This quantity of triple prisms makes possible a very compact arrangement giving a good reflection with low light losses in the respective directions. A larger number of triple prisms can be provided, but this quantity must be an even number.

An advantageous arrangement which is also advantageous because of its simple handling when used in land surveying results when the housing receiving the triple prisms is arranged on a target rod or is a component of such a target rod. In this connection, it is advantageous for purposes of high sighting accuracy when the intersection of the axes of the triple prisms lies in the axis of the target rod and the plane in which the axes of the triple prisms lie is intersected perpendicular by the sighting rod axis.

In the all-around reflector, the triple prisms are arranged in a plane in such a way that, in alternating manner, one of the edges of a prism of triple prisms located next to one another is adjacent in each instance to a reflection surface of the prisms located to the right and to the left. Accordingly, the prisms are so arranged in a plane which advantageously extends horizontally that, in alternating manner, first a prism edge of the triple prisms which are located next to one another and contact at a point and then, in the next adjacent prism, the image of this edge should extend parallel to one another and vertically upward in an arrangement formed of six prisms.

For the purpose of coarse sighting of a reflector arranged in the target point on a target rod, it is further advantageous when the housing of the reflector is closed on top by a cover on which a target mark or target tip is arranged.

In order to facilitate adjustment of at least one reflector vertical to the target direction, at least one pointing aid, for example, a bore hole, is provided in which are arranged rear and front sights. This at least one pointing aid is precisely aligned with the entrance aperture of at least one triple prism in such a way that when aiming the pointing aid with a light beam the associated triple prism is also impinged on.

In this way, the 360-degree all-around reflector according to the invention ensures in a simple construction and with low light losses a reflection of a radiated light bundle from light sources which are positioned an angle of 360° around the all-around reflector in the plane, or approximately in the plane, in which the triple prisms lie. The reflector according to the invention can also be used for precise positioning of construction machinery and for target tracking. Signal losses caused by a vertical offset of the pupils are minimized in a dependable manner. A sighting of the reflector proceeding from a plurality of geodetic devices simultaneously is also possible. The reflector nevertheless brings about advantages with respect to automated surveying in such a way that, among other things, a precise alignment of the reflector with the surveying device or with a plurality of surveying devices can be dispensed with when the reflector is carried around on land.

The invention will be explained more fully with reference to an embodiment example.

DESCRIPTION OF THE PREFERRED EMBODIMENTS

Figure 1:
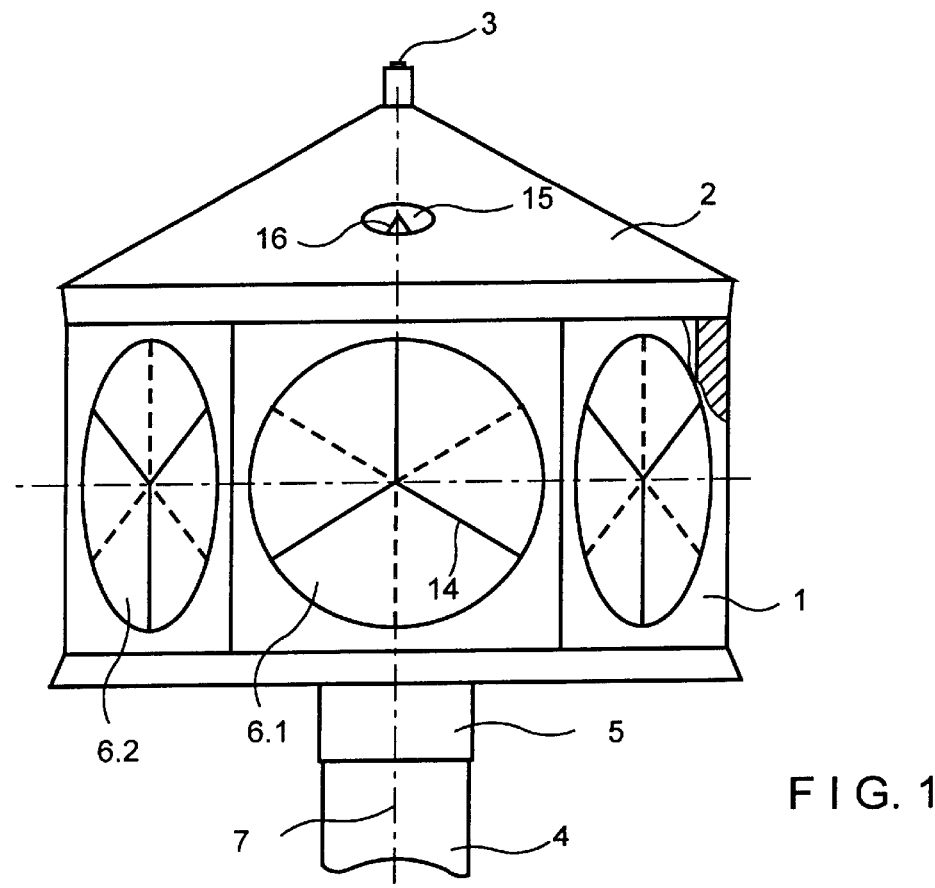
FIG. 1 a side view of a 360-degree all-around reflector according to the invention.

The 360-degree all-around reflector shown in FIG. 1 comprises a housing 1 with a cover 2 which closes the top of the housing 1 and which has a centrally arranged target tip or target mark 3 for coarse sighting through a light beam emitted by a geodetic device, e.g., a tachymeter (not shown). As is shown in FIG. 1, the all-around reflector is set on a target rod 4 by means of a receptacle 5. However, the entire all-around reflector can also be a fixed component of the target rod 4 and can accordingly be integrated therein.

According to the embodiment example shown in the drawing, six reflectors constructed as triple prisms 6.1; 6.2 are arranged around a central axis 7 in the housing 1 of the all-around reflector, wherein the light entrance surfaces 10 of the reflectors are preferably round and form parts of the circumferential surfaces of the housing 1. Instead of the triple prisms 6.1; 6.2 with three orthogonally arranged coated reflection surfaces 9 forming a cube corner or a tip 8, reflectors formed of three plane mirrors which are adjusted or fixed relative to one another can be used, wherein their reflecting surfaces advantageously likewise form a cube corner or a tip in order to minimize the reflection losses and ensure a retroreflection to the device emitting the light.

In order to realize an arrangement of the triple prisms 6.1 and 6.2 which is, for one, as compact as possible, these prisms are arranged in the housing 1 in such a way that adjacent triple prisms 6.1 and 6.2 contact at a point, or almost contact, inside the housing 1. The tips 8 and cube corners of the triple prisms 6.1; 6.2 lie in a plane extending perpendicular to the light entrance surfaces 10 of the triple prisms 6.1; 6.2, wherein the axes 11; 12; 13 of the triple prisms which intersect at a point A are also located in this plane. Triple prisms 6.1; 6.2 which are located next to one another are oriented relative to one another in such a way that they are arranged so as to be rotated about their axes 11; 12; 13 by an angle of 60°. The triple prisms 6.1; 6.2 are arranged in a plane in such a way that, alternately, one edge 14 of the prism 6.2 of triple prisms 6.1; 6.2 located next to one another is next to a reflection surface of the other prism 6.1. In the same way, prism edges and adjacent reflection surfaces of the individual triple prisms are located opposite one another.

The fact that an even quantity of triple prisms must always be provided is also due to this arrangement. In order to ensure a reliable and continuous sighting of the all-around reflector in an angular range of 360°, at least six triple prisms are required.

Figure 2:
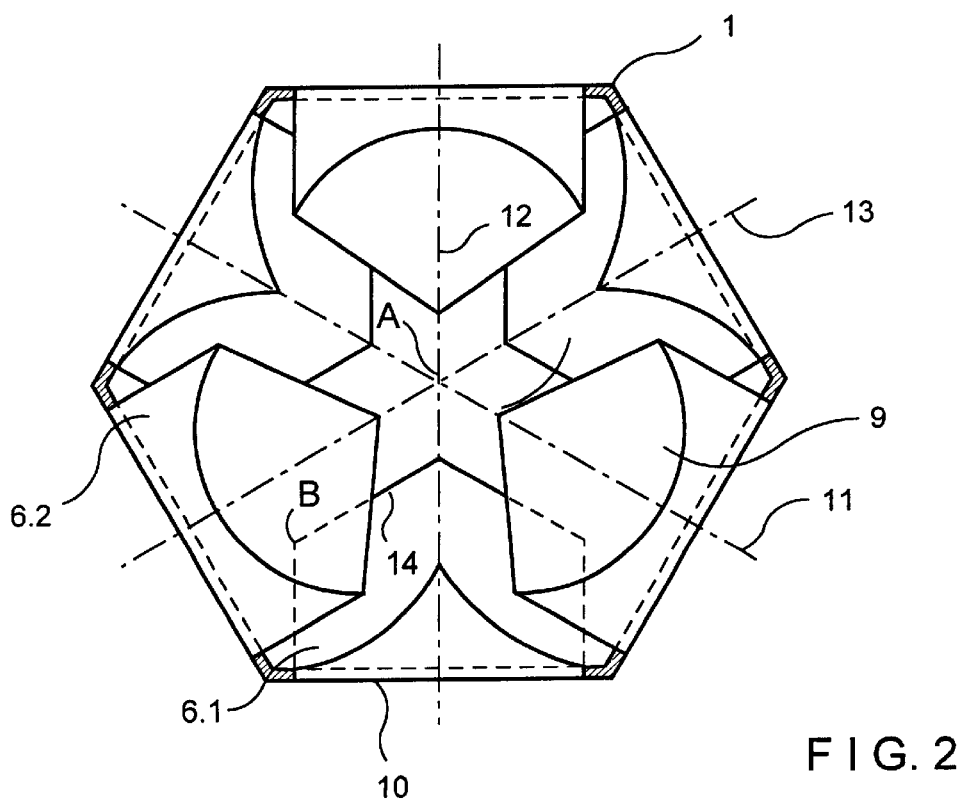
FIG. 2 a top view of the reflector arrangement with the cover removed.

The arrangement of six triple prisms in the housing 1 is clearly shown in FIG. 2. In a top view, it can be seen that an edge of a prism alternates with a reflection surface of the prism next to it. Accordingly, an edge and a reflection surface are always adjacent or contact one another at a point B (FIG. 2).

The triple prisms 6.1; 6.2 and the other prisms which are not designated by reference numbers are adjusted in such a way that their axes 11; 12 and 13 intersect at a point A lying in the central axis 7 which, at the same time, represents the target rod axis. The plane in which all three axes 11; 12 and 13 lie is penetrated perpendicular by the central axis 7.

To facilitate adjustment of at least one triple prism 6.1 vertical to the target direction, at least one pointing aid 15 is provided at the cover 2, for example, a bore hole or opening, in which rear and front sights 16 are arranged. This at least one pointing aid 15 is oriented exactly to the entrance aperture of at least one triple prism 6.1 in such a way that the associated triple prism 6.1 is impinged on when the pointing aid 15 is sighted with a light beam.

While the foregoing description and drawings represent the preferred embodiments of the present invention, it will be obvious to those skilled in the art that various changes and modifications may be made therein without departing from the true spirit and scope of the present invention.

What is claimed is:

1. A 360-degree all-around reflector for retroreflection of beams, comprising:

a housing;

triple prisms, as reflectors, with round light entrance surfaces, wherein the triple prisms are arranged in said housing in such a way that their light entrance surfaces are part of circumferential surfaces of the housing;

said triple prisms being arranged in said housing in such a way that adjacent triple prisms contact at a point, or almost so contact, inside the housing;

said triple prisms having tips or covers which lie in a plane extending perpendicular to the light entrance surfaces of the triple prisms;

said triple prisms having axes and wherein the axes of the triple prisms which intersect at a point are also located in this plane; and triple prisms which are located next to one another being oriented relative to one another so as to be rotated about their axes by an angle of 60°.

2. The all-around reflector according to claim 1, wherein an even number of triple prisms, but at least six, are provided in the housing.

3. The all-around reflector according to claim 1, wherein the housing receiving the triple prisms arranged on a target rod or is a component of such a rod.

4. The all-around reflector according to claim 1, wherein the triple prisms are arranged in a plane in such a way that, in alternating manner, one of the edges of a prism of triple prisms located next to one another is adjacent in each instance to a reflection surface of another prism.

5. The all-around reflector according to claim 3, wherein the intersection of the axes of the triple prisms lies in an axis of the target rod and the plane in which the axes of the triple prisms is intersected perpendicular by the sighting rod axis.

6. The all-around reflector according to claim 1, wherein the housing of the reflector is closed on top by a cover on which a target mark or target tip is arranged.

7. The all-around reflector according to claim 6, wherein at least one pointing aid is provided on the cover of the housing, wherein this at least one pointing aid is associated with at least one triple prism.

8. The around reflector according to claim 7, wherein the pointing aid is a bore hole in which a rear and front sight are arranged.

* * * * *